A. H. WOOD.
Gas Burner.
No. 642. Reissued Dec. 28, 1858.
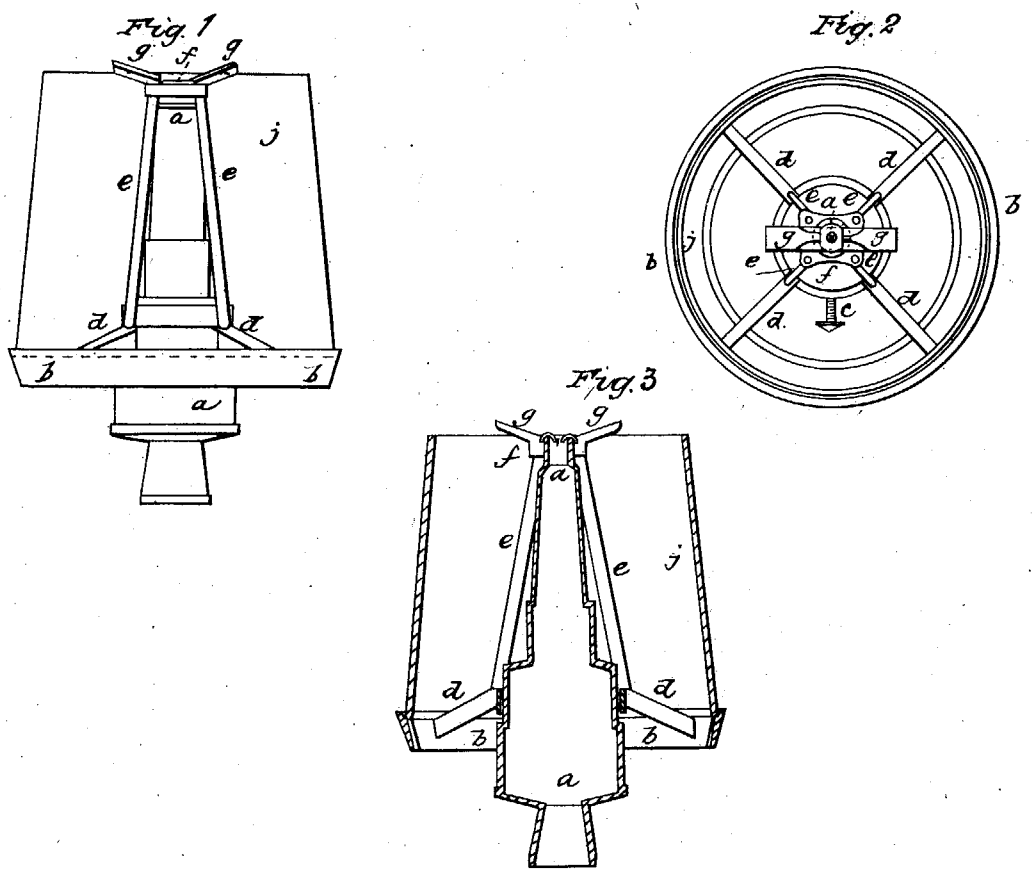
N. PETERS, Photo-Lithographer, Washington, D. C.

UNITED STATES PATENT OFFICE.

J. R. FOSTER, OF BOSTON, MASSACHUSETTS, ASSIGNEE OF A. H. WOOD.

IMPROVEMENT IN GAS-BURNERS.

Specification forming part of Letters Patent No. 21,586, dated September 21, 1858; Reissue No. 642, dated December 28, 1858.

*To all whom it may concern:*

Be it known that I, A. H. WOOD, of Boston, in the county of Suffolk and State of Massachusetts, have invented certain new and useful Improvements in Gas-Burners; and I do hereby declare that the following description, taken in connection with the accompanying drawings, hereinafter referred to, forms a full and exact specification of the same, wherein I have set forth the nature and principles of my said improvements, by which my invention may be distinguished from others of a similar class, together with such parts as I claim and desire to have secured to me by Letters Patent.

The figures of the accompanying plate of drawings represent my improvements.

Figure 1 is a side elevation of my improved gas-burner. Fig. 2 is a plan or top view of the same. Fig. 3 is a central vertical section.

Among the most important and desirable results which have been sought for in the construction of gas-burners may be mentioned the obtaining from a given quantity of gas the greatest amount of light, consuming all the gas which passes through the orifice of the burner, so as to use the same economically and prevent its escape into the apartment, and finally producing a brilliant and steady flame which is free from the flickering effect that occurs in the use of nearly all the gas-burners which have been devised.

These results are all obtained by my improvements, which consist in a novel arrangement of devices by which the width of the flame is increased and the heat from the flame conducted to a height above the orifice of the burner, for a purpose hereinafter specified.

The above-named devices may be applied to any ordinary bat-wing or fish-tail burner, and consist of two projections or "spreaders," as I term them, attached at any proper angle to the top of the burner, and four or any other number of metallic rods or tubes, also attached to the top of the burner near the flame and leading to an annular ring connected to the bottom of the burner. This ring supports a glass cone or cylinder, which extends no higher than the top of the burner, and consequently does not obstruct or shade the light.

Having thus premised the leading features of my invention, I shall now proceed to describe the construction of my improved gas-burner.

*a a* in the drawings represent a fish-tail burner constructed in the usual manner. *b b* is an annular ring fastened near the bottom of the burner by a set-screw, *c*, and supports a cone or cylinder, *j*, which reaches about to the top of the burner. From the cross-bars *d d d d* proceed four metallic rods or bars, *e e e e*, converging toward the top of the burner and inserted in a metallic plate, *f*, which fits over the burner, resting just below the top of the same. To the plate *f*, at an obtuse angle with the top of the burner and on either side of the orifice, are arranged two metallic flanges or spreaders, *g g*, which project out from the top of the burner, as shown in the drawings. The office of these flanges *g g* is to serve as a support to the base of the flame and to spread or increase the width of the same. When a flame is applied to the gas which is issuing from the orifice of the burner, the flanges *g g* become heated and conduct the flame out until it reaches their extremities, thus forming a flame as wide as the distance between the outer extremities of the flanges *g g*. The plate *f* soon becomes heated by the flame, and thus heats the rods *e e e e* which conduct the heat to the bottom of the burner. The air about the burner and between the same and the cone or cylinder *j* thus becomes heated, and thereby creates a draft of hot air, which is conveyed to the flame. The force of this draft serves to keep the flame steady and prevent its flickering.

As gas-burners are usually constructed the gas is forced at a high pressure through a small orifice, this high pressure being necessary in order to afford a moderate degree of steadiness to the flame.

As gas will burn much better at a low than at a high pressure, it will be seen that this mode of obtaining a steady light or an approximation to the same by a high pressure of gas is objectionable.

By my improvements, as will be evident by the foregoing description, the steadiness of the flame is produced by the flanges or spreaders *g g* and the draft produced by the conductors and cone, thereby permitting the use of a large orifice in the burner and enabling me to burn gas at a very low pressure, which experience has proved to be the most favorable for producing a brilliant light and the most economical consumption of the gas. It will further be evident that the devices hereinabove described for spreading and steadying the flame may be successfully applied to my self-regulating gas-burner, for which I obtained Letters Patent bearing date the 9th day of November, in the year 1852, and described in the schedule annexed to the same.

The arrangement of the spreaders has the effect of conducting the particles of coal, tar, &c., that obstruct the orifices of gas-burners as usually constructed to the points of extreme heat, which in this case are in the flanges or spreaders instead of in the orifice itself as in other gas-burners, thereby drawing, as it were, all the impurities from the orifice of the burner and consuming them on the spreaders or flanges, leaving a kind of ashes upon the same, which can readily be removed.

What I claim as my invention and improvement in jet gas-burners is—

1. The flame-spreader consisting of the wing-pieces *g g* extending outwardly from the gas-orifice, substantially in the manner and for the purposes herein set forth.

2. The heaters *c*, combined with the jet gas-burner, substantially in the manner and for the purpose herein set forth.

3. Combining with the jet gas-burner a draft-cone, *j*, the top of which terminates at or near the level of the gas-orifice, as set forth.

A. H. WOOD,
By J. R. FOSTER,
*Assignee of the Whole.*

Witnesses:
GEO. B. FOSTER,
F. O. WHITNEY.